United States Patent

Kobayashi et al.

Patent Number: 5,270,074
Date of Patent: Dec. 14, 1993

[54] SILICONE RESIN COATING COMPOSITIONS

[75] Inventors: Hideki Kobayashi; Wataru Nishiumi, both of Chiba, Japan

[73] Assignee: Dow Corning Toray Silicone Co., Ltd., Tokyo, Japan

[21] Appl. No.: 952,105

[22] Filed: Sep. 28, 1992

[30] Foreign Application Priority Data

Sep. 27, 1991 [JP] Japan ................... 3-277093

[51] Int. Cl.$^5$ ................ B05D 3/02
[52] U.S. Cl. ................... 427/154; 134/38; 427/387; 437/243; 528/31
[58] Field of Search ......... 134/38; 427/140, 271, 427/272, 273, 154, 387; 437/228, 249; 528/31

[56] References Cited

U.S. PATENT DOCUMENTS 3,673,099  6/1972  Corby et al. ............ 252/156
3,957,713  6/1976  Jeram et al. ............ 260/32.85 B Primary Examiner—Michael Lusignan
Attorney, Agent, or Firm—Roger E. Gobrogge

[57] ABSTRACT

The present invention relates to a method for removing a silicone resin coating from a substrate comprising contacting the silicone resin coating with an aqueous alkali solution, wherein the silicone resin in the coating is a solid silicone resin having the formula $(HR_2SiO_{\frac{1}{2}})_n(SiO_{4/2})_m$, wherein R is an alkyl group, m is a number greater than 0, n is a number greater than 0, and n/m is greater than 0.2.

9 Claims, No Drawings

SILICONE RESIN COATING COMPOSITIONS

BACKGROUND OF THE INVENTION

This invention relates to a method of applying a silicone resin coating to a semiconductor and to methods for its removal.

In a conventional method, a coating composition composed mainly of a silicone resin is usually a composite consisting mainly of a silicone resin prepared in the cohydrolysis polymerization of organochlorosilanes, such as methyltrichlorosilane, dimethyldichlorosilane, phenyltrichlorosilane, or phenylmethyldichlorosilane. These compounds are known as silicone varnishes, and are widely used as the coating material, sealing material and adhesive (bonding agent) on various substrates to meet the requirements of heat resistance, electrical insulation, or water repellency (see Plastic Materials 9, Silicone Resin, pp. 141-163, Nikkan Kogyo Shimbunsha, Feb. 10, 1978).

Although the silicone resin coating formed by the conventional varnish has excellent heat resistance and electrical insulation, it is insufficient with respect to the adhesion on substrates such as metals, glass, organic resist materials, or silicon. Also, coating removal from the substrate is insufficient in this case. Hence, the application is limited.

SUMMARY OF THE INVENTION

It was discovered that a coating formed from a silicone resin with a certain chemical structure has good adhesion on various types of substrates and it can be decomposed easily by an alkaline aqueous solution.

The object of this invention is to provide a silicone resin coating composition characterized by the fact that the silicone resin coating can be formed having good adhesion on various types of substrates and the silicone resin coating can be removed easily by an alkaline aqueous solution.

The present invention thus relates to a method for removing a silicone resin coating from a substrate comprising contacting the silicone resin coating with an aqueous alkali solution wherein the silicone resin in the coating is a solid silicone resin having the formula:

$$(HR_2SiO_{\frac{1}{2}})_n(SiO_{4/2})_m \quad (a)$$

wherein R is an alkyl group, m is a number greater than 0, n is a number greater than 0, and n/m is greater than 0.2. R in formula (a) hereinabove is preferably an alkyl group having from 1 to 20 carbon atoms, and most preferably is methyl.

The present invention also relates to a method of forming a silicone resin coating on a semiconductor comprising dissolving a silicone resin of the formula $(HR_2SiO_{\frac{1}{2}})_n(SiO_{4/2})_m$ in an organic solvent to form a coating composition, wherein R is an alkyl group, m is a number greater than 0, n is a number greater than 0, and n/m is greater than 0.2 and applying the coating composition on the semiconductor.

DETAILED DESCRIPTION OF THE INVENTION

The silicone resin of the invention may be manufactured by cohydrolysis of an organosilicon compound represented by the formula:

$$HMe_2SiX \quad (b)$$

where X represents a halogen atom, such as chlorine or bromine, or an alkoxy radical, such as methoxy radical, ethoxy radical, propoxy radical, or butoxy radical, and a silicon compound represented by the formula:

$$SiX_4 \quad (c)$$

where X has the same meaning as above. The above hydrolysis is carried out in the presence of an organic solvent and an acidic aqueous solution and is followed by water washing, neutralization and dehydration of the resultant silicone resin solution.

Several methods may be used to perform the cohydrolysis of the compounds represented by formulas (b) and (c) such as a method in which a solution of the mixture of the aforementioned silicon compounds in an organic solvent is added dropwise to an aqueous layer while being stirred or a method in which water is added dropwise to the solution in an organic solvent while being stirred. The water used may be of an acidic aqueous solution.

The organic solvent used should dissolve the compound represented by the formula (b), the compound represented by the formula (c), and the silicone resin formed. Examples of organic solvents that may be used include benzene, toluene, xylene and other aromatic organic solvents; hexane, heptane and other alkanes; diethyl ether, tetrahydrofuran and other ethers; methyl isobutyl ketone and other ketones. Among them, hexane, heptane, toluene, or xylene are preferred as they have a low solubility in water.

The concentration of the compounds represented by formulas (b) and (c) in the organic solvent should be selected to ensure that the concentration of the silicone resin formed in the organic solvent is 10-80 percent by weight.

Examples of acidic aqueous solutions that may be used include the aqueous solutions of sulfuric acid, nitric acid, hydrochloric acid and other acids. Among them, the aqueous solution of hydrochloric acid is preferred, the appropriate temperature after adding it dropwise being 0° to 100° C.

Depending on the requirement, an organic solvent or water is added to the silicone resin solution obtained in the cohydrolysis of the silicon compounds represented by formulas (b) and (c). The solution is then allowed to stand until separation of the water layer occurs. Water washing is carried out until the layer of the organic solvent containing the silicone resin becomes neutral. Dehydration is then performed. The dehydration operation may be carried out using an azeotropic operation with an organic solvent having a low solubility in water using a moisture separating column.

The obtained silicone resin still contains a certain amount of residual silanol radicals. These residual silanol radicals may be capped (blocked) by an organosilicon compound represented by the formula:

$$(HR'_2Si)_aQ \quad (d)$$

where R' represents $C_{1-8}$ substituted or unsubstituted monovalent hydrocarbon radical and a is 1 or 2. When a is 1, Q is selected from the group consisting of a hydrogen atom, halogen atom, hydroxyl radical, alkoxy radical, —NR''$_2$'—ONR''$_2$, —OCOR''; when a is 2, Q is —O— or —NR'', where R'' represents a hydrogen atom or alkyl radical. This operation, in which the residual silanol radicals are condensed, is preferred from the viewpoint that the organic solvent solution of the silicone resin becomes stable.

The organosilicon compound represented by formula (d) is a compound that reacts easily with the silanol radicals. In this formula, R' represents a $C_{1-8}$ monovalent hydrocarbon radical. The R' in a single molecule may be of the same type or different types. Examples of appropriate halogen atoms and alkoxy radicals in formula (d) are those presented for the organosilicon compound represented by formula (b). Examples of the alkyl radicals in formula (d) include methyl radical, ethyl radical, propyl radical, butyl radical, or pentyl radical.

The amount of organosilicon compound (d) used depends on the amount of the residual silanol radicals. For 100 parts by weight of the silicone resin represented by the average formula (a), an amount of 5-70 parts by weight is preferred, the excess portion being removed. The organosilicon compound represented by formula (d) is added to the solution of the silicone resin, and heating is performed if necessary. Then, water washing is carried out until the solution of the silicone resin becomes neutral. Next, dehydration is performed. Finally, stripping is performed for the organic solvent, forming the silicone resin(s) used in this invention.

When the organosilicon compound represented by formula (d) is used, there is a small amount of $HR'_2SiO_{\frac{1}{2}}$ siloxane units present in the resin represented by average formula (a). Although not explicitly shown in formula (a), this is also included within the scope of this invention. Also, as long as the purpose of this invention is not degraded, the silicone resin represented by average formula (a) may also contain a small amount of other methylsiloxane units.

As this invention is further explained, the silicone resin used in this invention has molar number n of $HMe_2SiO_{\frac{1}{2}}$ units and molar number m of $SiO_{4/2}$ units, wherein m and n are each greater than 0. The resin has a softening point higher than 40° C., or it may have no softening point, and the silicone resin is in solid form at room temperature. In this case, the smaller the value of n/m, the higher the softening point. As the softening point becomes greater than 40° C., n/m becomes higher than 0.2. The preferred range of n/m is n/m=0.2-1.5. If n/m is smaller than 0.2, the content of $SiO_{4/2}$, an inorganic component, is too large, and it is difficult for it to be dissolved in the organic solvent.

There is no special limitation on the type of the organic solvent used as long as it can dissolve the aforementioned silicone resin. Examples of the organic solvents that may be used include benzene, toluene, and other aromatic organic solvents; hexane, heptane and other aliphatic hydrocarbon organic solvents; diethyl ether, tetrahydrofuran and other ethers; methyl isobutyl ketone and other ketones. The amount of the organic solvent used depends on the application purpose of the coating composition of this invention. Usually, it is of 10-2000 parts by weight for 100 parts by weight of the aforementioned silicone resin.

In order to apply a coating of the silicone resin coating composition of this invention, coating, spraying, impregnation, and other conventional methods used for applying a coating to a substrate may be used, followed by heating, if necessary.

The aforementioned silicone resin coating composition of this invention may be used in various applications where a coating is to be formed. This is because the coating formed contains a $SiO_2$ component and has silicon-atom-bonded hydrogen atoms with a high reactivity. The silicone resin coating formed from the coating forming agent of this invention can decompose quickly if it comes in contact with an alkali aqueous solution. In this way, the silicone resin coating can be removed. This is because the $HMe_2SiO$ radicals are very weak with respect to alkali (such as ZOH, where Z is a metal); they react immediately and form water-soluble $HO-SiMe_2O$ radicals or $ZO-SiMe_2O$ radicals. The $SiO_2$ component is water-soluble. This feature can be exploited if the coating composition of this invention is used in forming the intermediate layer among a 3-layer resist or an interlayer insulating film, e.g., in the manufacturing process of semiconductor devices.

In the following, this invention will be explained in more detail with reference to the examples. In these examples, Me represents a methyl radical.

EXAMPLE 1

9.5 g of water, 10 g of methanol and 10 g of isopropyl alcohol were loaded into a flask. The mixture was stirred and cooled by ice to less than 10° C. A mixture of 19.5 g (0.1 mol) of $HMe_2SiCl$ and 30.4 g (0.2 mol) of tetramethoxysilane was then added dropwise over 30 minutes. After the end of the dropwise addition, stirring was continued at 15° C. for 2 hours. 100 ml of methyl isobutyl ketone, 100 ml of dimethyl ether, and 100 ml of water were then added and blended and the mixture was left standing. The organic layer was collected and then washed with water repeatedly. Finally, anhydrous sodium sulfate was added to the organic layer for dehydration for 1 day, followed by filtering and stripping of the solvent, forming 13 g of white solid. The white solid obtained did not display a softening point up to 300° C.

The analytical results of the white solid are as follows:

| SiNMR (ppm): |
| --- |
| 2(0.43Si, br, $HMe_2SiO1/2$) |
| −16(0.07Si, br, $ROMe_2SiO1/2$) |
| −100(0.45Si, br, $ROSiO3/2$) |
| −108(0.55Si, br, $SiO4/2$) | where R is Me or H.

On the $^{13}$C-NMR, a peak correspondence to Si—$CH_3$ was observed at 0 ppm and a methoxy radical peak was observed at 52 ppm. For GPC (gel permeation chromatography), it was found that the Mw(weight-average molecular weight)=$4.3\times10^3$.

The white solid sample obtained was determined to be a compound with a chemical structure of $(HMe_2SiO_{\frac{1}{2}})_{0.43}(SiO_{4/2})_1$ having residual hydroxy radicals and ethoxy radicals on the terminals.

2.5 g of the white solid sample were dissolved in 10 mL of toluene, forming a silicone resin coating composition. The silicone resin coating composition was spin coated at 2000 rpm on a silicon wafer. The coated sample was heated at 80° C. for 1 hr to form a silicone resin film. It was found that the coating was bonded well on the silicon wafer, with water repellency displayed on the surface. A 15% aqueous solution of tetramethyl ammonium hydroxide was then dripped onto the surface of the coating at an amount appropriate to form a liquid drop with a diameter of 1 cm. It was found that foaming took place for this portion of the silicone resin and it was dissolved within 1 min. This portion then became hydrophilic.

EXAMPLE 2

Example 1 was repeated except that the amount of HMe$_2$SiCl was changed to 6.6 g (0.07 mol), forming 12.0 g of silicone resin in solid form at room temperature. This sample displayed no softening point up to 300° C.

The analytical results of the white solid are as follows:

| SiNMR (ppm): |
| --- |
| 2(0.29Si, br, HMe2SiO1/2) |
| −16(0.08Si, br, ROMe2SiO1/2) |
| −100(0.47Si, br, ROSiO3/2) |
| −108(0.53Si, br, SiO4/2) | where R is Me or H.

On the $^{13}$C-NMR, a peak corresponding to Si—CH$_3$ was observed at 0 ppm, and a methoxy radical peak was observed at 52 ppm. For GPC (gel permeation chromatography), it was found that Mw (weight-average molecular weight) = $4.9 \times 10^3$.

The white solid sample obtained was determined to be a compound with a chemical structure of (HMe$_2$SiO$_{\frac{1}{2}}$)$_{0.29}$(SiO$_{4/2}$)$_1$ having residual hydroxy radicals and ethoxy radicals on the terminals. 2.5 g of the white solid sample were dissolved in 10 mL of toluene, forming a silicone resin coating composition.

The silicone resin coating composition was spin coated at 2000 rpm on a silicon wafer. The coated sample was heated at 80° C. for 1 hr. to form a silicone resin film. It found that the coating was bonded well on the silicon wafer, with water repellency displayed on the surface. A 15% aqueous solution of tetramethyl hydroxide was then dripped onto the surface of the coating at an amount appropriate to form a liquid drop with a diameter of 1 cm. It was found that foaming took place for this portion of the silicone resin and it was dissolved within 1 min.

EXAMPLE 3

The testing was performed in the same way as in Example 1 except that the amount of HMe$_2$SiCl in Example 1 was changed to 13.2 g (0.14 mol), forming 17.5 g of silicone resin in solid form at room temperature. The sample obtained was dissolved in 40.8 g of toluene, followed by the addition of 3.3 g (0.025 mol) of 1,1,3,3-tetramethyldisilazane, then stirring for 3 h at the reflux temperature. After reaction, neutralization and water washing were performed to remove the solvent, 19.8 g of solid silicone resin was formed at room temperature. The sample obtained had a softening point at 150° C. and its molecular weight was found by GPC as Mw (weight-average molecular weight) = $4.9 \times 10^3$.

The white solid sample obtained was determined to be a compound with a chemical structure of (HMe$_2$SiO$_{\frac{1}{2}}$)$_{0.8}$(SiO$_{4/2}$)$_1$ having residual hydroxy radicals and ethoxy radicals on the terminals.

Fragments of the white solid sample formed were dropped into a 15% aqueous solution of tetramethyl ammonium hydroxide. The white solid foamed and was dissolved within 1 min. Next, 2.5 g of the white solid sample were dissolved in 10 mL of toluene, forming a silicone resin coating composition. The solution was stored at room temperature for 6 months and no precipitate formed.

That which is claimed is:

1. A method for removing a silicone resin coating from a substrate comprising contacting the silicone resin coating with an aqueous alkali solution, wherein the silicone resin in the coating is a solid silicone resin having the formula:

$$(HR_2SiO_{\frac{1}{2}})_n(SiO_{4/2})_m$$

wherein R is an alkyl group, m is a number greater than 0, n is a number greater than 0, and n/m is greater than 0.2.

2. A method according to claim 1, wherein R is a methyl group.

3. A method according to claim 1, wherein n/m is from 0.2 to 1.5.

4. The method according to claim 1 wherein the silicone resin is capped by an organosilicon compound represented by the formula:

$$(HR'_2Si)_aQ \qquad (d)$$

wherein R' represents a C$_{1-8}$ substituted or unsubstituted monovalent hydrocarbon radical, a is 1 or 2, Q is selected from the group consisting of a hydrogen atom, a halogen atom, hydroxyl radical, alkoxy radical, —NR''$_2$'—ONR''$_2$, —OCOR'' when a is 1, Q is —O— or —NR'' when a is 2 and where R'' represents a hydrogen atom or alkyl radical.

5. A method of forming a silicone resin coating on a semiconductor comprising:
   dissolving a silicone resin of the formula (HR$_2$SiO$_{\frac{1}{2}}$)$_n$-(SiO$_{4/2}$)$_m$ in an organic solvent to form a coating composition, wherein R is an alkyl group, m is a number greater than 0, n is a number greater than 0, and n/m is greater than 0.2 and
   applying the coating composition on the semiconductor.

6. The method of claim 5 wherein the amount of organic solvent used is 10-2000 parts by weight for 100 parts by weight of the silicone resin.

7. The method according to claim 5 wherein the silicone resin is capped by an organosilicon compound represented by the formula:

$$(HR'_2Si)_aQ \qquad (d)$$

wherein R' represents a C$_{1-8}$ substituted or unsubstituted monovalent hydrocarbon radical, a is 1 or 2, Q is selected from the group consisting of a hydrogen atom, a halogen atom, hydroxyl radical, alkoxy radical, —NR''$_2$'—ONR''$_2$, —OCOR'' when a is 1, Q is —O— or —NR'' when a is 2 and where R'' represents a hydrogen atom or alkyl radical.

8. A method according to claim 5, wherein R is a methyl group.

9. A method according to claim 5, wherein n/m is from 0.2 to 1.5.

* * * * *